United States Patent
Kikukawa et al.

(10) Patent No.: US 8,588,045 B2
(45) Date of Patent: Nov. 19, 2013

(54) INFORMATION RECORDING METHOD AND INFORMATION RECORDING APPARATUS

(75) Inventors: Takashi Kikukawa, Tokyo (JP); Koji Mishima, Tokyo (JP)

(73) Assignee: TDK Corporation, Tokyo (JP)

( * ) Notice: Subject to any disclaimer, the term of this patent is extended or adjusted under 35 U.S.C. 154(b) by 845 days.

(21) Appl. No.: 12/531,739

(22) PCT Filed: Mar. 10, 2008

(86) PCT No.: PCT/JP2008/000513
§ 371 (c)(1),
(2), (4) Date: Sep. 17, 2009

(87) PCT Pub. No.: WO2008/129772
PCT Pub. Date: Oct. 30, 2008

(65) Prior Publication Data
US 2010/0034067 A1 Feb. 11, 2010

(30) Foreign Application Priority Data
Mar. 28, 2007 (JP) .................... 2007-083496

(51) Int. Cl.
*G11B 27/36* (2006.01)
*G11B 7/013* (2006.01)

(52) U.S. Cl.
USPC ........................ 369/53.24; 369/94

(58) Field of Classification Search
USPC ........... 369/53.2, 53.24, 94, 100, 13.39, 13.4, 369/13.41, 275.3, 280
See application file for complete search history.

(56) References Cited

U.S. PATENT DOCUMENTS

| 2003/0048733 | A1* | 3/2003 | Heemskerk et al. | ............ 369/94 |
| 2008/0049595 | A1* | 2/2008 | Mishima et al. | ............ 369/283 |
| 2008/0170485 | A1* | 7/2008 | Mishima et al. | ............ 369/100 |
| 2010/0074069 | A1* | 3/2010 | Iijima et al. | ............ 369/44.32 |
| 2011/0096643 | A1* | 4/2011 | Nakamura et al. | ......... 369/30.07 |

FOREIGN PATENT DOCUMENTS

| JP | 5101398 A | 4/1993 |
| JP | 7201078 A | 8/1995 |
| JP | 200316648 A | 1/2003 |
| JP | 2003303420 A | 10/2003 |
| JP | 200522409 A | 1/2005 |

* cited by examiner

*Primary Examiner* — Thang Tran
*Assistant Examiner* — Dionne Pendleton
(74) *Attorney, Agent, or Firm* — Porzio, Bromberg & Newman, P.C.

(57) ABSTRACT

Information is recorded on a multi-layered optical recording medium by irradiating it with a laser beam. The recording medium can form a first information recording layer that is the farthest from a light incident surface, a second information recording layer that is the second farthest from the light incident surface, and at least one third information recording layer that is located closer to the light incident surface than the second information recording layer is. At this time, if all the information recording layers other than the first information recording layer are either blank or have been completely recorded, then information is recorded on the first information recording layer. This allows for stabilizing the energy of a recording laser beam during recording and thereby providing improved recording quality.

1 Claim, 8 Drawing Sheets

INFORMATION RECORDING METHOD AND INFORMATION RECORDING APPARATUS

CROSS REFERENCE TO RELATED APPLICATION

This is a National Stage of International Application PCT/JP2008/000513, filed 10 Mar. 2008, which claims the benefit of Application No. 2007-083496, filed in Japan on 28 Mar. 2007, the disclosures of which Applications are incorporated by reference herein.

TECHNICAL FIELD

The present invention relates to a method for recording information on a multi-layered optical recording medium which may be made of a plurality of information recording layers, and to an information recording apparatus for carrying out the information recording method.

BACKGROUND ART

Conventionally, for viewing of digital video contents or recording of digital data, various types of optical recording media have been widely employed, including CD-DAs, CD-ROMs, CD-Rs, CD-RWs, DVD-ROMs, DVD-Rs, DVD+/−RWs, and DVD-RAMs. On the other hand, these types of optical recording media have been demanded of ever-increasing recording capacities. To meet these requirements, a start has already been made at preparing for the market so-called next-generation DVDs as products that can store massive video images and data. The next-generation DVD has an increased recording capacity which has been achieved by reducing the wavelength of the laser beam, used for recording and reading, to as short as 405 nm.

For example, the Blu-ray Disc (BD) standards or one of the next-generation DVD standards employs a setting of 0.85 for the numerical aperture of the objective lens, thereby enabling recording and reading of 25 GB on a single recording layer.

However, further increases will be expected in the capacity for video images and data in the future. In this context, a technological breakthrough concerning a so-called multi-layered optical recording medium has been suggested to provide it with an increased number of recording surfaces to thereby increase its capacity. Another technology has also been suggested for BD-standard multi-layered optical recording media in Non-Patent Document 1 by I. Ichimura et. al., Appl. Opt., 45, 1794-1803 (2006) or in Non-Patent Document by K. Mishima et. al., Proc. of SPIE, 6282, 628201 (2006). Those recording media are provided with 6- to 8-layer recording surfaces, thereby realizing as very large a capacity as 200 GB.

DISCLOSURE OF THE INVENTION

Problems that the Invention is to Solve

When a multi-layered information recording layer is irradiated with a laser beam for recording, the amount of light reaching the intended information recording layer varies depending on the information recording status of another information recording layer through which the laser beam passes. Though not-yet publicly made known at the time of filing this application, a fact was found through the studies by the present inventor. That is, it was revealed that variations in transmittance of the information recording layer through which the laser beam passes is likely to cause increases by 10% or more in variation of the percentage of the recording laser beam reaching the information recording layer. This has an adverse effect on the recording quality of the information recording layer. It was particularly revealed that the aforementioned variation in transmittance readily causes recording error to occur because the laser beam irradiating the information recording layer that is the farthest from the light incident surface needs to pass through all the other information recording layer.

The present invention has been achieved in view of the foregoing problem. It is therefore an object of the invention to provide a recording method which prevents deterioration in recording quality even with the optical recording medium having a multi-layered structure.

Means for Solving the Problems

As a result of intensive studies by the present inventor, the aforementioned object can be achieved by the means described below.

An information recording method of the present invention that achieves the aforementioned object is an information recording method including irradiating a multi-layered optical recording medium with a laser beam to record information thereon, with the multi-layered optical recording medium being able to form a first information recording layer that is the farthest from a light incident surface, a second information recording layer that is the second farthest from the light incident surface, and at least one third information recording layer that is located closer to the light incident surface than the second information recording layer is. The method is characterized by comprising, when all the information recording layers other than the first information recording layer are either blank or have been completely recorded, recording information on the first information recording layer.

The information recording method that achieves the aforementioned object is characterized in the aforementioned invention by comprising, when all the information recording layers other than the first information recording layer are blank, recording information on the first information recording layer.

The information recording method that achieves the aforementioned object is characterized in the aforementioned invention by comprising, when the first information recording layer has been completely recorded and the third information recording layer is blank, recording information on the second information recording layer.

The information recording method that achieves the aforementioned object is characterized in the aforementioned invention by comprising, after the first information recording layer and the second information recording layer have been completely recorded, recording information on the third information recording layer.

The information recording method that achieves the aforementioned object is characterized in the aforementioned invention by comprising completely recording each of the information recording layers in order of decreasing distance from the light incident surface.

The information recording method that achieves the aforementioned object is characterized in the aforementioned invention by comprising, when all the information recording layers other than the first information recording layer have been completely recorded, recording information on the first information recording layer.

The information recording method that achieves the aforementioned object is characterized in the aforementioned invention by comprising, when the first, second, and third information recording layers are irradiated with a laser beam of the same power, setting the total reflectivity based on an incident beam on the light incident surface and a reflected beam emitted from the light incident surface to be similar for the first, second, and third information recording layers.

An information recording apparatus of the present invention that achieves the aforementioned object is an information recording apparatus for irradiating a multi-layered optical recording medium with a laser beam to record information thereon, with the multi-layered optical recording medium being able to form a first information recording layer that is the farthest from a light incident surface, a second information recording layer that is the second farthest from the light incident surface, and at least one third information recording layer that is located closer to the light incident surface than the second information recording layer is. The information recording apparatus includes: a recording status detection unit for detecting a recording status of an information recording layer of the multi-layered optical recording medium; a recording area setting unit for setting an information recording area to be recorded based on a result of detection provided by the recording status detection unit; and a laser control unit for irradiating the information recording layers with a laser beam to record information thereon based on an instruction from the recording area setting unit. The apparatus is characterized in that when the recording status detection unit has detected that all the information recording layers other than the first information recording layer are either blank or have been completely recorded, the recording area setting unit sets the first information recording layer to the information recording area.

The information recording apparatus that achieves the aforementioned object is characterized in the aforementioned invention in that when the recording status detection unit has detected that the first information recording layer has been completely recorded and the third information recording layer is blank, the recording area setting unit sets the second information recording layer to the information recording area.

The information recording apparatus that achieves the aforementioned object is characterized in the aforementioned invention in that after the recording status detection unit detects that the first information recording layer and the second information recording layer have been completely recorded, the recording area setting unit sets the third information recording layer to the information recording area.

Effects of the Invention

The present invention provides advantageous effects that the energy of a recording laser beam can be stabilized during recording and thus recording quality can be improved.

BEST MODE FOR CARRYING OUT THE INVENTION

A description will now be made to the principle which underlies the information recording method according to an embodiment.

Figure 1:
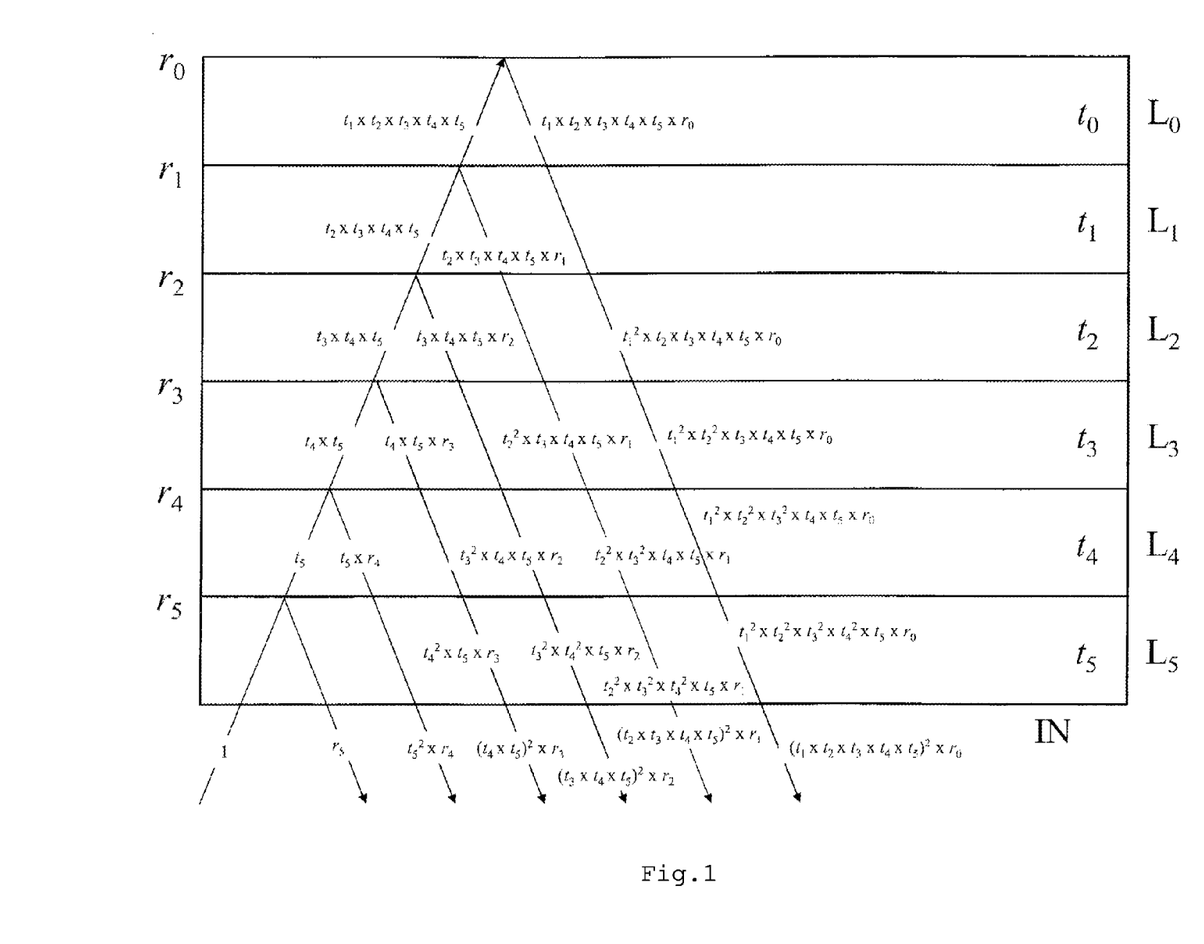
FIG. 1 is an explanatory cross-sectional view illustrating the concept of the total reflectivity of a multi-layered optical recording medium according to an embodiment of the present invention.

By way of example, a multi-layered optical recording medium is taken which includes six layers of a layer L0, . . . , a layer Lk, . . . , and a layer L5. It is assumed that $r_k$ is the reflectivity of the information recording surface of the layer Lk itself; $t_k$ is the transmittance of the information recording surface of the layer Lk itself; and $R_k$ is the reflectivity in the stacked state when the layer Lk is irradiated with a laser beam ($0 \leq k \leq 5$) (i.e., the total reflectivity determined based on the amount of light incident upon the light incident surface and the amount of reflected light emitted from this light incident surface). As shown in FIG. 1, each information recording layer reflects part of the laser beam and transmits another part thereof. For example, suppose that the information recording layer serving as the layer L3 is irradiated with a laser beam of energy 1. In this case, initially, the laser beam incident on a light incident surface IN passes only by $t_5$ through the layer L5 to reach the layer L4. Then, the beam passes only by ratio $t_4$ through the layer L4 to reach the layer L3, so that the layer L3 is eventually irradiated with a laser beam of $t_4 \times t_5$. This laser beam ($t_4 \times t_5$) is reflected in the layer L3 at the ratio $r_3$, and thus the reflected beam is $(t_4 \times t_5) \times r_3$ in the layer L3. This reflected beam further passes through the layer L4 and the layer L5 by the ratios $t_4$ and $t_5$, respectively, and then emitted from the light incident surface IN. As a result, with the laser beam incident on the light incident surface IN being taken as a reference (1), the total reflectivity $R_3$ at which the laser beam is reflected in the layer L3 and then emitted through the light incident surface IN is expressed by $(t_4 \times t_5)^2 \times r_3$. Likewise, $R_0, R_1, \ldots,$ and $R_5$ are expressed by the equations below.

[Equations for calculating the total reflectivity]

$$R_0 = (t_1 \times t_2 \times t_3 \times t_4 \times t_5)^2 \times r_0$$

$$R_1 = (t_2 \times t_3 \times t_4 \times t_5)^2 \times r_1$$

$$R_2 = (t_3 \times t_4 \times t_5)^2 \times r_2$$

$$R_3 = (t_4 \times t_5)^2 \times r_3$$

$$R_4 = (t_5)^2 \times r_4$$

$$R_5 = r_5$$

For the information recording and reading apparatus to be able to read out information on all the information recording layers under the same reading conditions, the total reflectivity is preferably the same for each layer. That is, in the aforementioned examples, it is preferable that $R_0 = R_1 = R_2 = R_3 = R_5$.

Assuming the total reflectivity is set to $R_0=R_1=R_2=R_3=R_5=2.5\%$, the reflectivity $r_k$ and the transmittance $t_k$ of each recording layer are shown in Table 1 as an example.

TABLE 1

| Recording layer $L_n$ | Reflectivity $r_k$ (%) | Transmittance $t_k$ (%) | Total reflectivity $R_k$ (%) |
|---|---|---|---|
| $L_5$ | 2.5 | 87.7 | 2.5 |
| $L_4$ | 3.1 | 86.0 | 2.5 |
| $L_3$ | 4.2 | 83.1 | 2.5 |
| $L_2$ | 6.0 | 79.0 | 2.5 |
| $L_1$ | 9.4 | 73.1 | 2.5 |
| $L_0$ | 18.0 | 47.3 | 2.5 |

As can be seen from Table 1, to allow the information recording layers to share the same total reflectivity $R_k$, the transmittance $t_k$ of the information recording layer at a deeper (farther) location from the light incident side needs to be set to a lower value. Note that the relationship that $r_k+t_k+a_k=1$ holds true, where $a_k$ is the absorption index of the information recording layer for the laser beam.

Now under these conditions, consider a multi-layered optical recording medium having a number n of layers from L0 to Ln-1 and a case where its layer Lk recording surface (k≤n) is irradiated with a laser beam from a pickup at a laser power 1. Assume that the transmittance of the layer Lk is $t_{bk}$ (0≤$t_{bk}$≤1) when the layer Lk recording surface is blank, and the transmittance is $t_{mk}$ (0≤$t_{mk}$≤1) when the recording surface has been already recorded.

When all the layers from L1 to Ln-1 are blank, i.e., all the recording surfaces that are located closer to the light incident surface than the layer L0 is are blank, the laser power $I_{b0}$ that reaches the layer L0 is expressed by $I_{b0}=t_{b1}\times \ldots \times t_{bk}\times \ldots \times t_{b(n-1)}$. On the other hand, when all the layers L1 to Ln-1 have already been recorded, i.e., all the recording surfaces that are located closer to the light incident surface than the layer L0 is have already been recorded, the laser power $I_{m0}$ that reaches the layer L0 is expressed by $I_{m0}=t_{m1}\times \ldots \times t_{mk}\times \ldots \times t_{m(n-1)}$. Therefore, when expressed in terms of ratios, the difference between the $I_{b0}$ and $I_{m0}$ is $I_{b0}/I_{m0}\{t_{b1}\times \ldots \times t_{bk}\times \ldots \times t_{b(n-1)}\}/\{t_{m1}\times \ldots \times t_{mk}\times \ldots \times t_{m(n-1)}\}$. From the recording drive viewpoint, $I_{b0}/I_{m0}=1$ is ideal because it is not desirable for the laser power to vary depending on the recording status of another recording layer when recording on the layer L0.

However, for the multi-layered optical recording medium, the difference $(r_{bk}-r_{mk})$ in reflectivity $r_k$ between the information recording layers being blank and having been recorded is a signal output, and thus this difference must be assured. Furthermore, the absorption index $a_k$ is a factor, for example, for determining the sensitivity at which record marks are formed on the information recording layer. It is thus desirable to provide an increased absorption index $a_k$ for recording at as low a power as possible. On the other hand, the absorption index $a_k$ must be reduced to such an extent that the information recording layer irradiated with a read laser beam will not deteriorate in quality. Accordingly, since there is a certain restriction on the value of the absorption index $a_k$, the aforementioned difference in reflectivity $(r_{bk}-r_{mk})$ is, after all, significantly reflected on the difference in transmittance $(t_{bk}-t_{mk})$. As a result, it is extremely difficult to make the aforementioned ratio $I_{b0}/I_{m0}$ equal to 1.

Now the aforementioned descriptions will be checked using specific numerical values. Assume that $TiO_2$/Bi—Ge—O/$TiO_2$ that has a very high transmittance is used as the information recording layer for the multi-layered optical recording medium. For this information recording layer, the thickness of each material and the composition of Bi—Ge—O can be controlled so that $t_b$=0.83 and $t_m$=0.88. Here, Table 2 shows how the powers $I_{b0}$ and $I_{m0}$, resulted from a laser beam of the laser power I reaching the layer L0 information recording layer that is the farthest from the light incident surface, vary depending on the number n of multi-layers. Note that shown here is a case where all the recording surfaces from the layer L1 to layer Ln-1 that are located closer to the light incident surface than the layer L0 is employ a raw material of a transmittance $t_b$=0.83 and $t_m$=0.88.

TABLE 2

| Number of layers | Recorded status | Not-yet recorded status | Ratio of variation |
|---|---|---|---|
| N = 2: | $I_{b0}$ = 0.83I, | $I_{m0}$ = 0.88I, | $I_{b0}/I_{m0}$ = 0.94 |
| N = 3: | $I_{b0}$ = 0.69I, | $I_{m0}$ = 0.77I, | $I_{b0}/I_{m0}$ = 0.90 |
| N = 4: | $I_{b0}$ = 0.57I, | $I_{m0}$ = 0.68I, | $I_{b0}/I_{m0}$ = 0.84 |
| N = 5: | $I_{b0}$ = 0.47I, | $I_{m0}$ = 0.60I, | $I_{b0}/I_{m0}$ = 0.78 |
| N = 6: | $I_{b0}$ = 0.33I, | $I_{m0}$ = 0.46I, | $I_{b0}/I_{m0}$ = 0.72 |

As is clear from the results, when the layer L0 information recording layer is irradiated with a recording laser beam, the power that reaches the layer L0 varies a great deal depending on whether or not the other layers have been recorded. More specifically, in the case of a 2-layer optical recording medium (n=3), the power that reaches the layer L0 varies by 6% depending on whether or not the layer L1 has been recorded. Likewise, in the case of a 3-layer optical recording medium, the power that reaches the layer L0 varies by 10% depending on whether or not the layers L1 and L2 have been recorded. It can also be seen that a 4-layer optical recording medium has a variation of 16%, a 5-layer optical recording medium has a variation of 22% and a 6-layer optical recording medium has a variation of 28%.

This fact becomes a non-negligible issue for the layer L0 at which the laser beam usually arrives at reduced power. More specifically, consider an information recording layer located closer to the light incident surface than the layer L0 is, and that part of the surface has been already recorded but the other portions has not yet been recorded, i.e., information has been recorded halfway on that information recording layer. In this case, the power of the recording laser beam that reaches the layer L0 information recording layer varies halfway during the recording operation. This results in recording errors, for example, because record marks may not be formed sufficiently well on the layer L0 information recording layer or they may not be formed as intended due to an excessive power.

In this context, the present embodiment is configured such that only when the other layer information recording layers other than the layer L0 information recording layer are blank or have been completely recorded, recording is carried out on the layer L0 information recording layer. For example, when all the information recording layers are blank, recording is started initially on the layer L0 information recording layer. As used herein, the term "recording" refers not to the recording of disc management information but to the recording of user data to be stored. The term "being blank" refers to a state in which no user data is recorded on the information recording layer. Furthermore, as used herein, the expression "completely recorded" refers to a state where recording operations have been completed across the entire area on the information recording layer that can sustain user data.

A description will now be given of the embodiments of the present invention in detail.

Figure 2A:
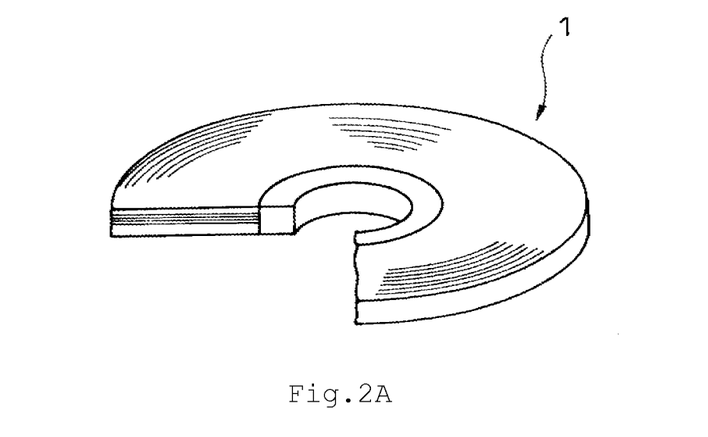
FIG. 2 shows a perspective view and an enlarged sectional view illustrating a multi-layered optical recording medium that is employed by a first embodiment of the present invention.
Figure 2B:
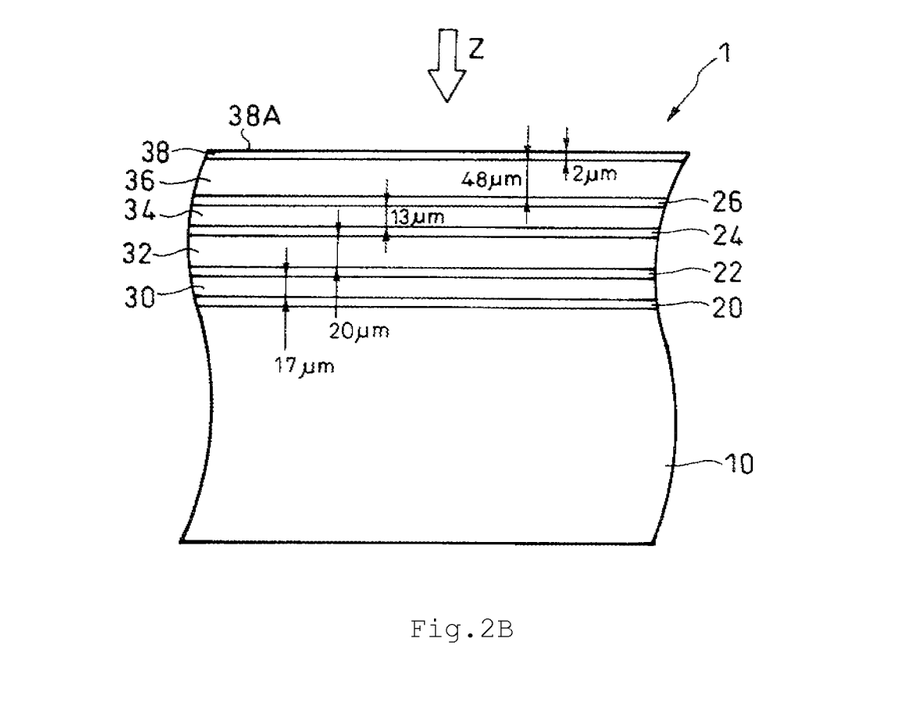

First, with reference to FIG. 2(A), a description will be made to a multi-layered optical recording medium 1 that is used for an information recording apparatus according to a first embodiment of the present invention. This multi-layered optical recording medium 1 is a disc-shaped medium with an outer diameter of about 120 mm and a thickness of about 1.2 mm. As shown in an enlarged view of FIG. 2(B), the multi-layered optical recording medium 1 includes a substrate 10, an L0 information recording layer 20, a first spacer layer 30, an L1 information recording layer 22, a second spacer layer 32, an L2 information recording layer 24, a third spacer layer 34, an L3 information recording layer 26, a cover layer 36, and a hard coat layer 38, which are stacked in that order.

All of the first to third spacer layers 30, 32, and 34, the cover layer 36, and the hard coat layer 38 are optically transparent and thus transmit laser beams that are incident thereon from outside. As a result, a laser beam Z incident upon a light incident surface 38A of the hard coat layer 38 can be used for recording or reading of information on all the L0 to L3 information recording layers 20, 22, 24, 26, and 28.

The L0 information recording layer 20 is the light incident side information recording layer that is the farthest from the light incident surface 38A, whereas the L3 information recording layer 26 is the nearest to the light incident surface 38A. To record or read information on the L0 information recording layer 20, the L0 information recording layer 20 is irradiated with the laser beam Z via the L1 to L3 information recording layers 22, 24, and 26. Likewise, to record or read information on the L1 information recording layer 22, the L1 information recording layer 22 is irradiated with a laser beam Z2 via the L2 and L3 information recording layers 24 and 26. To record or read information on the L2 information recording layer 24, the L2 information recording layer 24 is irradiated with a laser beam via the L3 information recording layer 26. To record or read information on the L3 information recording layer 26, the L3 information recording layer 26 is directly irradiated with the laser beam Z not via another information recording layer. Note that this multi-layered optical recording medium 1 is configured such that each of the L0 to L3 information recording layers 20, 22, 24, and 26 has a recording capacity of 25 GB, which sums to a total recording capacity of 100 GB.

The substrate 10 is a disc-shaped member, about 1.1 mm in thickness, which can be made of various raw materials such as glass, ceramics, or resin. In this embodiment, polycarbonate resin was employed. Note that as resins other than polycarbonate resin, it is also possible to employ, for example, olefin resin, acrylic resin, epoxy resin, polystyrene resin, polyethylene resin, polypropylene resin, silicone resin, fluorine-based resin, ABS resin, or urethane resin. Among them, polycarbonate resin or olefin resin can be preferably employed because of the ease of machining or molding. Furthermore, the surface of the substrate 10 on the information recording layer side is provided, as required, with grooves, lands, pit arrays, or the like.

The first to third spacer layers 30, 32, and 34 are stacked between the L0 to L3 information recording layers 20, 22, 24, and 26, respectively, and serve to separate between each of the information recording layers 20, 22, 24, and 26. On the surface of each of the spacer layers 30, 32, and 34 on the light incident surface 38A side, for example, grooves (lands) or pit arrays are formed. The first to third spacer layers 30, 32, and 34 can be formed of various materials; however, as already mentioned, it is necessary to use an optically transparent material to transmit the laser beam Z. For example, it is also preferable to use a UV curable acrylic resin.

Furthermore, this multi-layered optical recording medium 1 is configured such that the first spacer layer 30 has a thickness of 17 μm, the second spacer layer 32 has a thickness of 20 μm, and the third spacer layer 34 has a thickness of 13 μm, and thus these layers are set to be at least 10 μm or more. Furthermore, the plurality of spacer layers 30, 32, and 34 are different from each other in thickness as mentioned above, thereby making it possible to reduce interference between read signals as well as noise of readout signals. This difference in thickness should be preferably at least 2 μm or more. Note that the hard coat layer 38 is set to have a thickness of 2 μm and the cover layer 36 is set to have a thickness of 48 μm. As seen from above, for the information recording layers 20, 22, 24, and 26 stacked in multiple layers, in order to allow a sufficiently enough intensity of the laser beam Z to reach the L0 information recording layer 20 that is the farthest from the light incident surface 38A, the light transmission characteristics of the other information recording layers 22, 24, and 26 have to be increased.

Accordingly, this multi-layered optical recording medium 1 is designed such that the distance from the light incident surface 38A to the L3 information recording layer 26 is about 50 μm; the distance from the light incident surface 38A to the L2 information recording layer 24 is about 63 μm; the distance from the light incident surface 38A to the L1 information recording layer 22 is about 83 μm; and the distance from the light incident surface 38A to the L0 information recording layer 20 is about 100 μm. This shows that the L0 information recording layer 20 is compatible to the Blu-ray Disc (Blu-ray Disc) standards including its recording capacity (25 GB).

Furthermore, this multi-layered optical recording medium 1 is configured such that when the L0 to L3 information recording layers 20, 22, 24, and 26 are irradiated with a laser beam of the same power, the total reflectivity which is derived from the reflected beam emitted from the light incident surface 38A with respect to the incident beam is similar.

These L0 to L3 information recording layers 20, 22, 24, and 26 are layers for retaining data. The scheme of retaining data is of a so-called writable type which allows the user to write data. In more detail, this writable type is divided into a write-once type which does not allow overwriting of data on an area on which data has been previously written; and a rewritable type which allows deleting of written data and overwriting of new data on that area. This embodiment can employ either type. It is also possible for the information recording layers 20, 22, 24, and 26 to retain data in different manners.

Note that although not specifically illustrated, the L0 to L3 information recording layers 20, 22, 24, and 26 are provided with spiral grooves and lands. The grooves serve as a guide track for the laser beam Z during data recording, so that the energy intensity of the laser beam Z travelling along the grooves is modulated, thereby forming record marks on the information recording layers 20, 22, 24, and 26 on the grooves. Note that in the case of the write-once type for retaining data, the record marks are formed irreversibly and thus cannot be erased. On the other hand, in the case of the rewritable type for retaining data, record marks are formed reversibly so that they can be erased and re-formed. The record marks can be formed on the lands or both on the grooves and lands.

Figure 3:
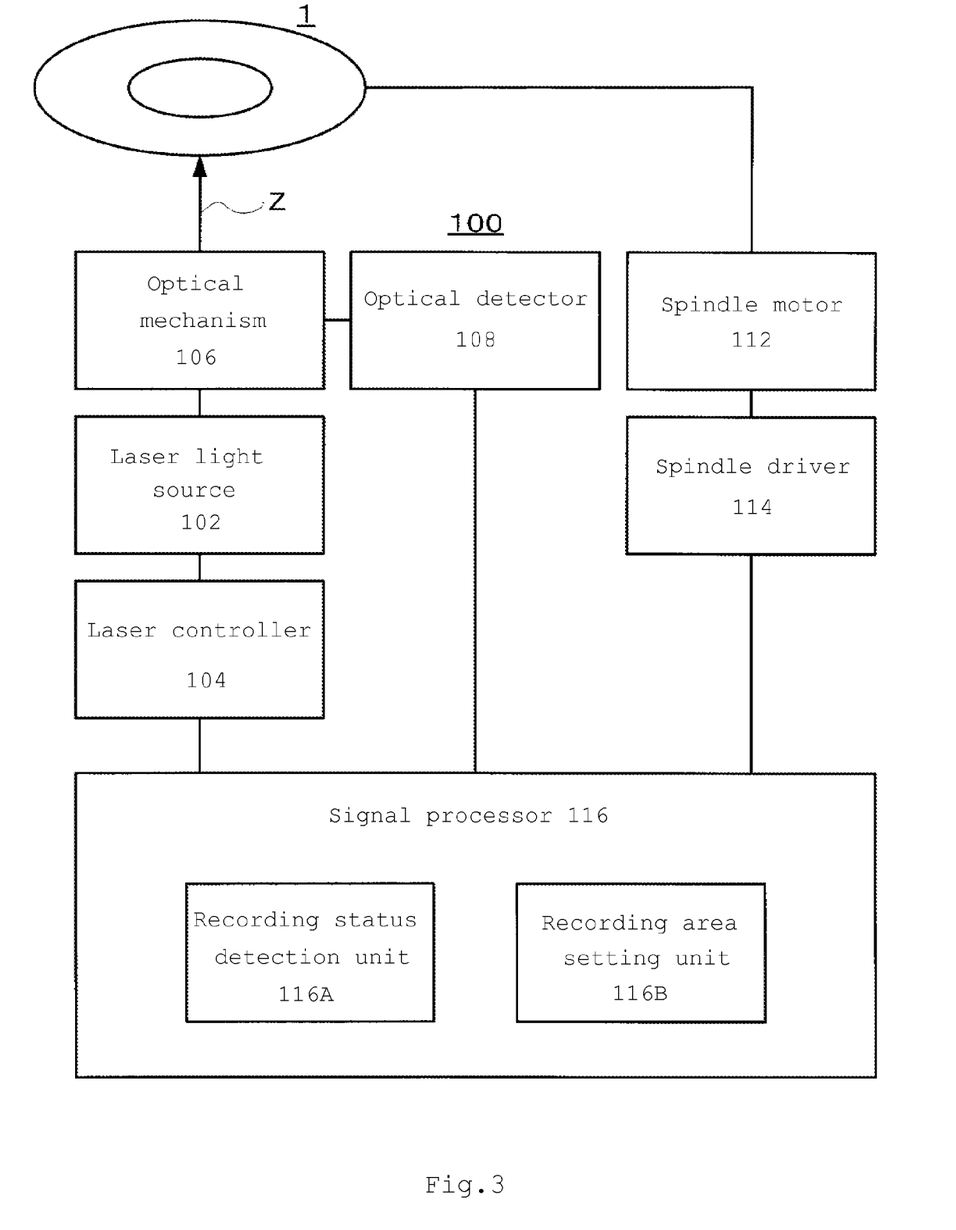
FIG. 3 is a block diagram illustrating the configuration of an information recording apparatus according to an embodiment of the present invention.

Now, with reference to FIG. 3, a description will be made to an information recording apparatus 100 that realizes an information recording method of this embodiment. The information recording apparatus 100 includes: a laser light source 102 for emitting a laser beam Z used for recording or reading; a laser controller 104 for controlling the laser light source 102; an optical mechanism 106 for guiding the laser beam Z to the multi-layered optical recording medium 1; an optical detector 108 for detecting a reflected beam of the laser beam Z; a spindle motor 112 for rotating the multi-layered optical recording medium 1; a spindle driver 114 for controlling the rotation of the spindle motor 112; and a signal processor 116 for communicating signal data with a CPU (Central Processing Unit—not shown) and providing recording and reading control based on write signal data and read signal data. The signal processor 116 includes a recording status detection unit 116A for detecting the recording status of an information recording layer of the multi-layered optical recording medium 1, and a recording area setting unit 116B for setting a recording area on which recording is to be performed among a plurality of information recording layers.

The laser light source 102 is a semiconductor laser and controlled by the laser controller 104 to produce the laser beam Z. The optical mechanism 106 includes a half mirror and an objective lens (not shown), and can focus the laser beam Z on the L0 to L3 information recording layers 20, 22, 24, and 26, as appropriate. Note that the half mirror directs the reflected beams from the L0 to L3 information recording layers 20, 22, 24, and 26 into the optical detector 108. The optical detector 108 is a photo-detector which receives a reflected beam of the laser beam Z and then outputs it as a signal. The signal is supplied to the signal processor 116 and used as control data and read signal data, and part of it is delivered to the CPU (not shown).

To record the signal data supplied by the CPU on the multi-layered optical recording medium 1, the laser controller 104 controls the laser light source 102, based on the instruction from the signal processor 116 that has received the signal data, to generate the predetermined laser beam Z. The laser beam Z is guided by the optical mechanism 106 and used as a laser spot to irradiate either one of the L0 to L3 information recording layers 20, 22, 24, and 26. The energy of this laser spot serves to form record marks on the L0 to L3 information recording layers 20, 22, 24, and 26.

On the other hand, to read the information recorded on the multi-layered optical recording medium 1, a read laser beam is produced from the laser light source 102, and then this read laser beam is used to irradiate a particular location of the L0 to L3 information recording layers 20, 22, 24, and 26. The read laser beam is reflected on the L0 to L3 information recording layers 20, 22, 24, and 26, and then directed via the optical mechanism 106 into the optical detector 108, so that it passes through the signal processor 116 and is supplied to the CPU as the read signal.

The recording status detection unit 116A detects the information recording status of the L0 to L3 information recording layers 20, 22, 24, and 26. More specifically, it detects where the previous information recording operation has been completed among the L0 to L3 information recording layers 20, 22, 24, and 26 or detects the respective recording capacity (remaining area) of the L0 to L3 information recording layers 20, 22, 24, and 26. These detections may be preferably realized by reading out various types of information recorded in the read-in area or read-out area at the time of completion of the previous information recording. But it is also possible to detect by directly reading the recording status of the L0 to L3 information recording layers 20, 22, 24, and 26. When all the L0 to L3 information recording layers 20, 22, 24, and 26 are blank, it can be determined that this multi-layered optical recording medium 1 is a completely blank disc.

At the start of writing information or the like, the recording area setting unit 116B utilizes a result of detection by the aforementioned recording status detection unit 116A to select a area to be recorded from among the L0 to L3 information recording layers 20, 22, 24, and 26.

For example, the multi-layered optical recording medium 1 is inserted into the information recording apparatus 100 to start recording of information. At this time, the information recording layer on which the recording is to be started is selected from among the L0 to L3 information recording layers 20, 22, 24, and 26 and an information recording area is also determined from among the information recording layers chosen. Furthermore, for example, while information is being recorded on a certain information recording layer, this information recording layer may be completely recorded, i.e., a recording operation may be completed on the entire recording area. In this case, the next information recording layer on which recording is to be performed is selected from the L0 to L3 information recording layers 20, 22, 24, and 26 and an information recording area is also determined from among these information recording layers.

Figure 4:
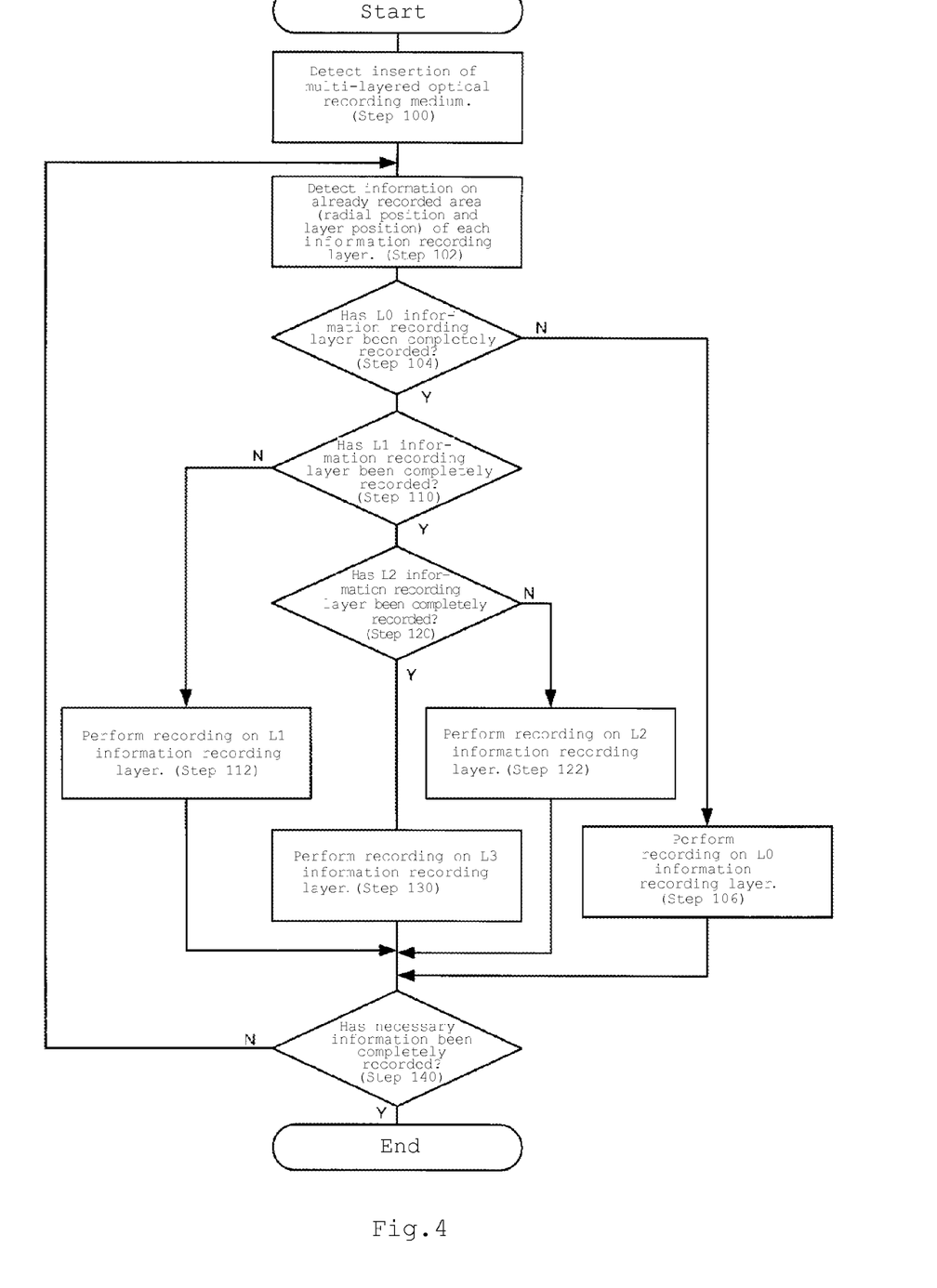
FIG. 4 is a flowchart showing the procedure for recording information using the information recording apparatus.

FIG. 4 is a flowchart showing the procedure for recording information using this information recording apparatus 100.

Initially, in step 100, the process determines whether the intended multi-layered optical recording medium 1 has been inserted into the apparatus. After that, in step 102, the recording status detection unit 116A reads out the read-in area or read-out area of this multi-layered optical recording medium 1 to detect the recording status of the L0 to L3 information recording layers 20, 22, 24, and 26. More specifically, the process detects the already recorded area (the information recording layer and radial position) of each of the L0 to L3 information recording layers 20, 22, 24, and 26.

In step 104, the recording area setting unit 116B determines whether the L0 information recording layer 20 (the information recording layer that is the farthest from the light incident surface 38A) of the multi-layered optical recording medium 1 has been completely recorded. If the recording has not yet been completed, i.e., if there remains a recordable area, then in step 106, the process starts recording on the recordable area of the L0 information recording layer 20 based on the determination made by the recording area setting unit 116B.

If in step 104, the L0 information recording layer 20 has been completely recorded, then in step 110, the process determines whether the L1 information recording layer 22 (the information recording layer that is the second farthest to the light incident surface 38A) has been completely recorded. If the L1 information recording layer 22 has not yet been completed, i.e., if there remains a recordable area, then in step 112, the process starts recording on the recordable area of the L1 information recording layer 22 based on the determination made by the recording area setting unit 116B.

If in step 110, the L1 information recording layer 21 has been completely recorded, then in step 120, the process determines whether the L2 information recording layer 24 (the information recording layer that is the third farthest from the light incident surface 38A) has been completely recorded. If the L2 information recording layer 24 has not yet been completely recorded, i.e., if there remains a recordable area, then in step 122, the process starts recording on the recordable area of the L2 information recording layer 24 based on the determination made by the recording area setting unit 116B.

If in step 120, the L2 information recording layer 24 has been completely recorded, then in step 130, the process chooses, as appropriate, the L3 information recording layer 26s as a recordable area. Following the steps above, the process records necessary information on the L0 to L3 information recording layers 20, 22, 24, and 26 selected, and finally in step 140, determines whether the necessary information has been completely recorded. If the necessary information has not yet been completely recorded, the process returns to step 102 to move on to the next information recording layer. If the necessary information has been completely recorded, the process ends the recording step.

According to the information recording method and the information recording apparatus 100 of the present embodiment, it is possible to start recording on the L0 information recording layer 20 when all of the L0 to L3 information recording layers 20, 22, 24, and 26 of the multi-layered optical recording medium 1 are blank. Accordingly, the energy of the laser beam that reaches the L0 information recording layer 20 is not varied, while recording, due to information having been recorded up to a some midpoint on the L1, L2 and L3 information recording layers 22, 24 and 26. As a result, it is possible to record information with stability on the L0 information recording layer 20.

Furthermore, since the L1, L2 and L3 information recording layers 22, 24 and 26 are also blank, they have a higher light transmittance and thus the energy of the laser beam can be set to a lower value.

Furthermore, in the present embodiment, recording is completely performed on the information recording layers in order of decreasing distance from the light incident surface 38A. For the same reason as above, this is because an information recording layer farther from the light incident surface 38A will be more susceptible to variations in the energy of the laser beam due to the presence of a larger number of already recorded areas and not-yet-recorded areas. This results from the existence of a larger number of information recording layers between that surface and the light incident surface 38A. Accordingly, in the present embodiment, the laser beam irradiating the intended information recording layer always passes through a blank information recording layer, thereby stabilizing the energy of the laser beam.

Figure 5:
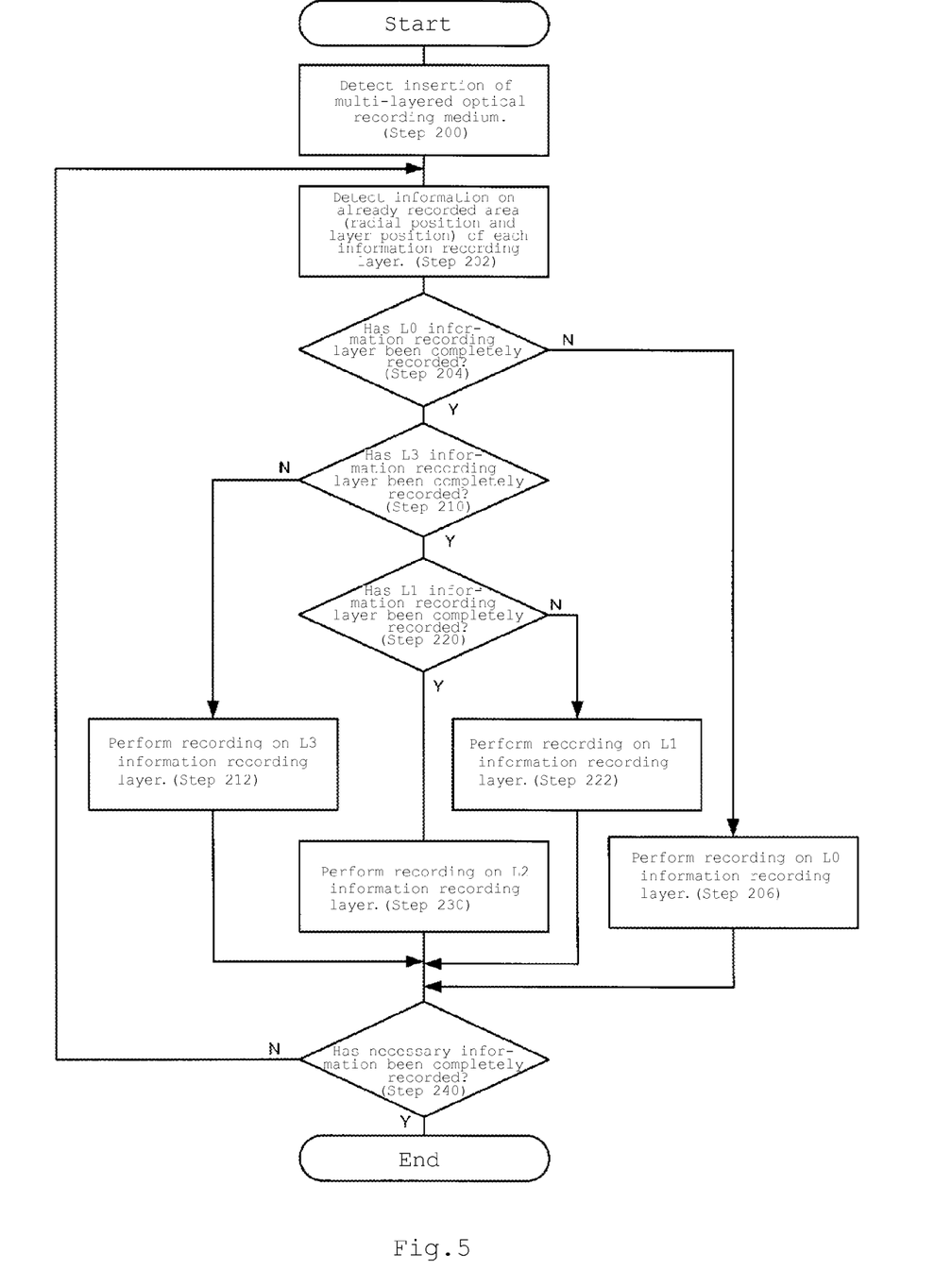
FIG. 5 is a flowchart showing an information recording procedure according to a second embodiment of the present invention.

Now, with reference to the flowchart of FIG. 5, a description will now be presented to an information recording method according to a second embodiment of the present invention. In this recording method, as shown in step 200 to step 240 of FIG. 5, after the L0 information recording layer that is the farthest from the light incident surface has been completely recorded, information is recorded on the L3 information recording layer 26 that is the closest to the light incident surface and the subsequent information recording layers in decreasing order of distance therefrom will be completely recorded. Note that the configurations of the optical recording medium and the information recording apparatus used with the second embodiment are the same as those of the first embodiment, and thus, the same reference symbols as those of the first embodiment will be employed, so that the configurations will not be illustrated or described repeatedly. Furthermore, as described above, this embodiment employs the same flowchart as that of the first embodiment shown in FIG. 4 with the exception that the order of recording is different from each other, and thus detailed explanation will not be presented.

Figure 6A:
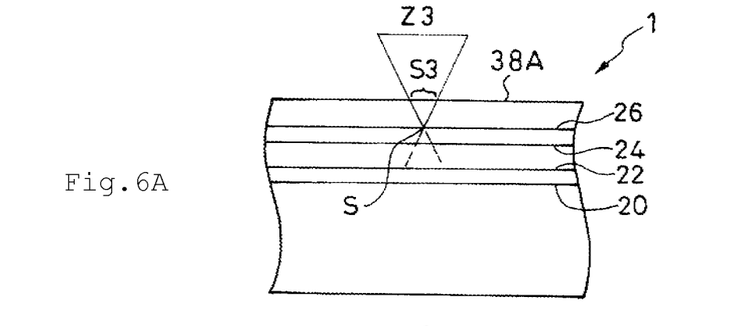
FIG. 6 is a cross-sectional view illustrating a status in which information is recorded on each information recording layer of the multi-layered optical recording medium.
Figure 6B:
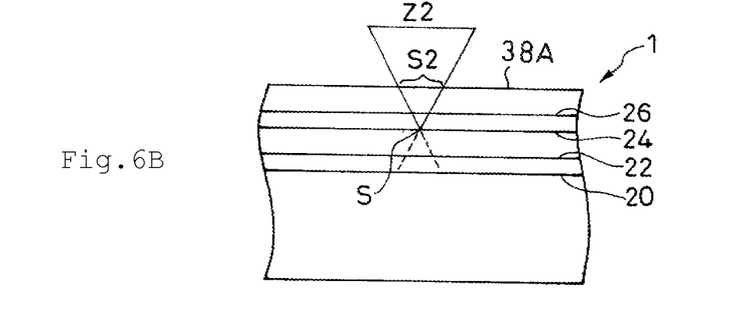
Figure 6C:
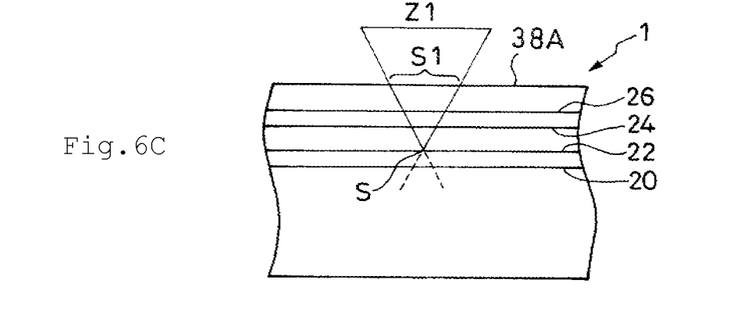
Figure 6D:
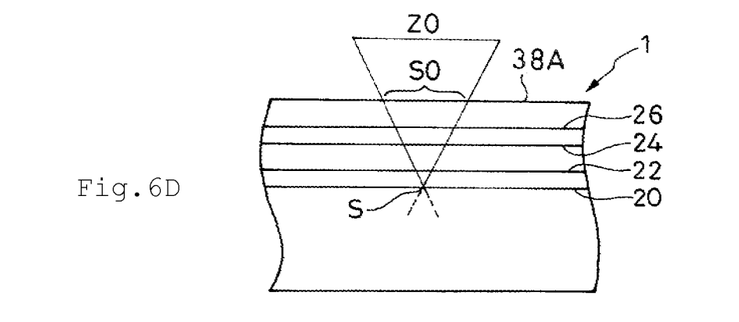

In the second embodiment, after recording has been completed on the L0 information recording layer 20, information is recorded on the L3 information recording layer 26 that is the closest to the light incident surface 38A. This is because the information recording layer that is closer to the light incident surface 38A is more susceptible to foreign matters such as fingerprints adhered to the light incident surface 38A or scratches. Accordingly, the recording thereon is to be completed before adherence of foreign matters or the like, i.e., at a comparatively earlier stage of use of the multi-layered optical recording medium 1. More specifically, for example, as shown in FIG. 6(A), to record information on the L3 information recording layer 26, focus control is provided so that the beam spot S of the laser beam Z3 is substantially minimized on the L3 information recording layer 26. At this time, on the light incident surface 38A, an intermediate beam spot S3 that is greater than the beam spot S is formed of the laser beam Z3. Furthermore, as shown in FIG. 6(B), to record on the L2 information recording layer 24, focus control is provided so that the beam spot of the laser beam Z2 is substantially minimized on the L2 information recording layer 24. At this time, an intermediate beam spot S2 that is greater than the beam spot S is formed by the laser beam Z2 on the light incident surface 38A. As shown in FIG. 6(C), to record on the L1 information recording layer 22, focus control is provided so that the beam spot of the laser beam Z1 is substantially minimized on the L1 information recording layer 22. At this time, an intermediate beam spot S1 that is greater than the beam spot S is formed by the laser beam Z1 on the light incident surface 38A. As shown in FIG. 6(D), to record on the L0 information recording layer 20, focus control is provided so that the beam spot of the laser beam Z0 is substantially minimized on the L0 information recording layer 20. At this time, an intermediate beam spot S0 that is greater than the beam spot S is formed by the laser beam Z0 on the light incident surface 38A.

Figure 7:
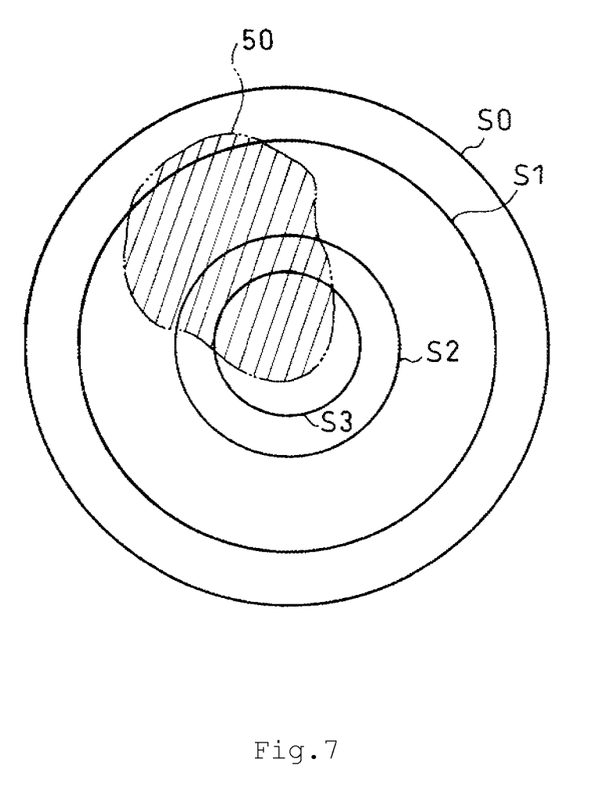
FIG. 7 is an enlarged plan view schematically illustrating beam spots formed on a light incident surface of the multi-layered optical recording medium and a foreign matter adhered thereto.

FIG. 7 shows a comparison made between the sizes of the intermediate beam spots S0 to S3 formed on the light incident surface 38A. It can be seen that the intermediate beam spot S3 is the smallest in size and followed by S2, S1, and S0 in ascending order of size. This is because the focus (laser spot S) is more separated from the light incident surface 38A with increasing distance from the light incident surface 38A to the information recording layers 20, 22, 24, and 26. While the user carries the multi-layered optical recording medium 1 with her/him or inserts it into a read/write apparatus, a foreign matter 50 such as fingerprints or dust particles will be adhered to or scratches may be made on the light incident surface 38A. The foreign matter 50 may cause deterioration in the recording characteristics of the multi-layered optical recording medium 1. In particular, with increasing ratios of the foreign matter 50 to the intermediate beam spots S0 to S3 formed on the light incident surface 38A, record marks are formed less sufficiently because the energy of the recording laser beam Z is blocked with the foreign matter 50. Accordingly, the L3 information recording layer 26 can be said to be susceptible to the foreign matter 50. In particular, according to the BD standards, the information recording layer located within 70 μm from the light incident surface 38A causes the ratio of the foreign matter 50 to be higher to a non-negligible level. Thus, a higher recording priority is placed on the L3 information recording layer 26 that is located at 50 μm from the light incident surface 38A.

Figure 8:
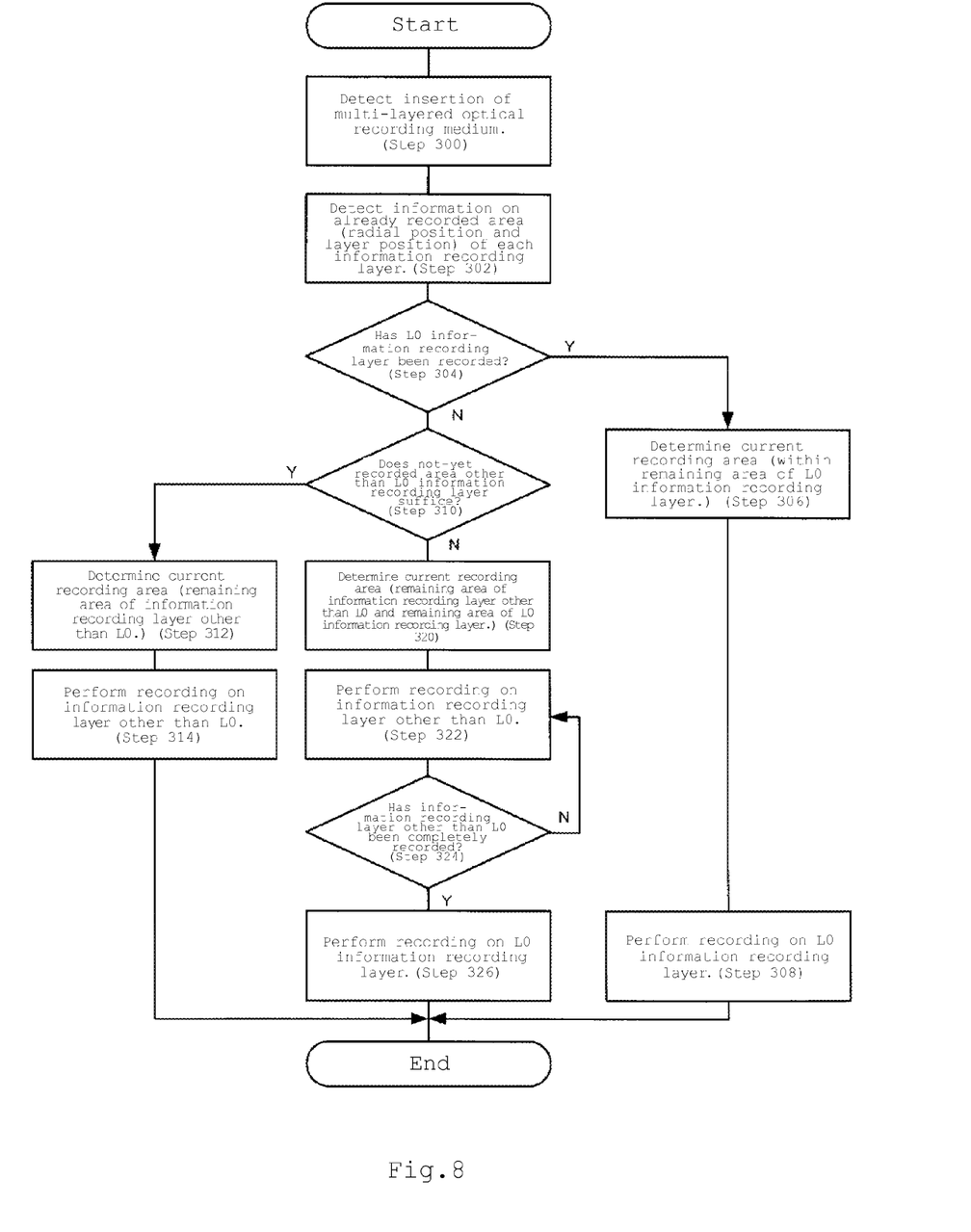
FIG. 8 is a flowchart showing an information recording procedure according to a third embodiment of the present invention.

Now, with reference to the flowchart of FIG. 8, a description will be made to an information recording method according to a third embodiment of the present invention. In the third embodiment, recording on the information recording layer that is the farthest from the light incident surface is carried out last of all the information recording layers. Note that the optical recording medium and the configuration of the information recording apparatus employed in the third embodiment are those of the first embodiment, and thus hereinafter will be denoted with the same symbols as those for the first embodiment, whereby their illustration and explanation of its configuration will be omitted.

According to this information recording method, first in step 300, the process determines whether or not a multi-layered optical recording medium 1 to be recorded has been inserted. After that, in step 302, the recording status detection unit 116A reads out the read-in area or read-out area of the multi-layered optical recording medium 1 to detect the recording status of the L0 to L3 information recording layers 20, 22, 24, and 26. More specifically, the already recorded area (the recording surface and radial position) of each of the L0 to L3 information recording layers 20, 22, 24, and 26 is detected.

In step 304, the recording area setting unit 116B determines whether any information has already been recorded on the L0 information recording layer 20 of the multi-layered optical recording medium 1 (the information recording layer that is the farthest from the light incident surface 38A). If some information has already been recorded thereon, then as described later, all the information recording layers (the L1 information recording layer 22, the L2 information recording layer 24, and the L3 information recording layer 26) other than the L0 information recording layer 20 have been completely recorded. Thus, the recording area setting unit 116 sets, in step 306, the remaining area of the L0 information recording layer 20 to the current recording area and then, in step 308, records information thereon.

On the other hand, in steps 304, if the L0 information recording layer 20 is blank, then a recordable area is thought to remain on another information recording layer, and thus the process proceeds to step 310. In steps 310, the process determines whether the recordable area other than on the L0 information recording layer 20 is sufficient for the amount of information to be currently recorded. If it suffices, then in step 312, the recording area setting unit 116B sets the remaining area other than the L0 information recording layer 20 to the current recording area. After that, the process proceeds to step 314 to carry out recording.

Furthermore, in step 310, the recordable area other than the L0 information recording layer 20 may not be able to accommodate the amount of information to be currently recorded. Then, in step 320, all the remaining areas of the information recording layers other than the L0 information recording layer 20 and the recordable area on the L0 information recording layer 20, corresponding to the shortage in the remaining area, are set to the current recording area. After that, in step 322, recording is preferentially performed on the aforementioned remaining area of other than the L0 information recording layer 20. Then, in step 324, the process determines whether the recording on the remaining area has been completed, i.e., that all the information recording layers other than the L0 information recording layer 20 have been completely recorded. Then, in step 326, recording is carried out on the L0 information recording layer 20.

According to the information recording method of the third embodiment, when recording is carried out on the L0 information recording layer 20 that is the farthest from the light incident surface 38A, all the other information recording layers have been already completely recorded. That is, information is recorded preferentially on an information recording layer other than the L0 information recording layer 20, and thus recording is conducted last of all on the L0 information recording layer 20.

Accordingly, the other information recording layers have been completely recorded when recording is to be done on the L0 information recording layer 20. No boundary thus exists between the already recorded area and the not-yet recorded area on these other information recording layers. As a result, it is possible to prevent variations of the energy of the recording laser beam with which the L0 information recording layer 20 is irradiated. This makes it possible to record information with stability and reduce recording errors. Note that in the third embodiment, the energy of the laser beam which irradiates the L0 information recording layer 20 is reduced due to the record marks of the L1 to L3 information recording layers 22, 24 and 26 which have been completely recorded. To compensate for this reduction, it is preferable to set the laser power to a somewhat higher value.

Note that the third embodiment illustrated is adapted to carry out recording last of all on the L0 information recording layer 20. However, as already shown, as for the other information recording layers, it is preferable to place a higher priority on the recording on the L3 information recording layer 26 that is the closest to the light incident surface 38A.

As described above, for the information recording apparatus of the present embodiment, such an example was illustrated in which 4 or more layers are formed within as very narrow a range as about 100 μm from the light incident surface. However, the present invention is not limited thereto. It is also possible to locate an information recording layer at 100 μm or farther point. Furthermore, in the present embodiment, such an example was illustrated in which the number of information recording layers of the multi-layered optical recording medium is limited to four layers. However, the present invention is not limited thereto, and 3 layers or more may also be employed. Furthermore, in the present embodiment, the first information recording layer that is the farthest from the light incident surface 38A is referred to as the L0 information recording layer, the second farthest second information recording layer as the L1 information recording layer, and a third information recording layer, which is located closer to the light incident surface 38A than the second information recording layer is, as the L2 information recording layer and the L3 information recording layer. However, these references are intended only for convenience and impose no restrictions on the present invention.

Furthermore, the multi-layered optical recording medium 1 of the present embodiment illustrated has on each information recording layer a recording layer, which varies in state when being irradiated with a laser beam. However the present invention is not limited thereto. For example, the basis material itself of the optical recording medium is a monolithic structure having a predetermined thickness. But, it is also possible to employ a so-called volume written recording medium in which when the basis material is irradiated with a laser beam, only a portion thereof on which the beam spot is focused changes in state for recording data. That is, the multi-layered optical recording medium of the present invention is not limited to a structure in which the recording layer to be irradiated with a laser beam is pre-formed in multiple layer stacking but also include one in which record marks are formed, as required, at a location separated from the light incident surface by a predetermined distance, and multi-layered information recording layers are constructed post hoc as a collection of those record marks.

Note that the information recording apparatus of the present invention is not limited to the aforementioned embodiments, but may of course be modified in a variety of ways without deviating from the scope of the present invention.

INDUSTRIAL APPLICABILITY

The present invention provides high-quality recording or reading, without reducing recording capacity, for multi-layered optical recording media which can form three or more layers of information recording layers.

The invention claimed is:

1. An information recording apparatus for irradiating a multi-layered optical recording medium with a laser beam to record information thereon, with the multi-layered optical recording medium being able to form a first information recording layer that is the farthest from a light incident surface, a second information recording layer that is the second farthest from the light incident surface, and at least one third information recording layer that is located closer to the light incident surface than the second information recording layer is, the information recording apparatus comprising:
 a recording status detection unit for detecting a recording status of an information recording layer of the multi-layered optical recording medium;
 a recording area setting unit for setting an information recording area to be recorded based on a result of detection provided by the recording status detection unit; and
 a laser control unit for irradiating the information recording layers with a laser beam to record information thereon based on an instruction from the recording area setting unit, wherein
 when the recording status detection unit has detected that all the information recording layers other than the first information recording layer are blank, the recording area setting unit sets the first information recording layer to the information recording area;
 when the recording status detection unit has detected that the first information recording layer has been completely recorded and the third information recording layer is blank, the recording area setting unit sets the second information recording layer to the information recording area; and
 after the recording status detection unit detects that the first information recording layer and the second information recording layer have been completely recorded, the recording area setting unit sets the third information recording layer to the information recording area.

* * * * *